United States Patent [19]

Nussbaumer

[11] 4,005,641
[45] Feb. 1, 1977

[54] APPARATUS FOR ROTATING AND DISPLACING IN AXIAL DIRECTION A MACHINE ELEMENT

[75] Inventor: Thomas Nussbaumer, Zug, Switzerland

[73] Assignee: Patent & Inventions Ltd., Zug, Switzerland

[22] Filed: Dec. 23, 1974

[21] Appl. No.: 535,847

[30] Foreign Application Priority Data

Jan. 4, 1974  France ............................ 74.00225

[52] U.S. Cl. ........................................ 92/2; 92/33; 92/108; 92/113
[51] Int. Cl.[2] ........................................ F01B 21/00
[58] Field of Search ................ 92/2, 3, 33, 31, 52, 92/108, 113, 65, 68

[56] References Cited
UNITED STATES PATENTS

| | | | |
|---|---|---|---|
| 3,353,352 | 11/1967 | Gardner | 92/108 |
| 3,510,915 | 5/1970 | Johansson | 92/2 X |
| 3,592,108 | 7/1971 | Rosaen | 92/52 |
| 3,613,169 | 10/1971 | Ziegler | 92/2 X |
| 3,620,131 | 11/1971 | Nitkiewicz | 92/2 |
| 3,808,953 | 5/1974 | Herbst | 92/2 |
| 3,815,479 | 6/1974 | Thompson | 92/2 |

Primary Examiner—Martin P. Schwadron
Assistant Examiner—Abraham Hershkovitz
Attorney, Agent, or Firm—Werner W. Kleeman

[57] ABSTRACT

An apparatus for selectively moving, for instance alternately or simultaneously rotating and displacing in axial direction, a machine element mounted to be rotatable and axially displaceable, comprising a motor, a hollow cylinder and a piston displaceable in said hollow cylinder. The piston is provided with a connection element for rigidly connecting it with the machine element. The piston also has a lengthwise extending opening which is sealed towards the outside at the side of the connection element and at the other end there extends into said lengthwise extending opening a drive shaft connected with said motor. This drive shaft at the side of the connection element has an end which together with the inner surface of the piston forms a first sealing section forming a sealed sliding seat, said drive shaft at the region of its end connected with the motor possessing a second sealing section which together with the hollow cylinder or an element rigidly connected therewith forms a tightly closing sliding seat. The piston and the drive shaft possess coupling means disposed between both of the sealing sections, said coupling means rigidly rotatably connecting the piston and the drive shaft with one another but permitting axial displacement relative to one another. The drive shaft possesses a throughpassage which connects a first hydraulic connection with an end section of the lengthwise extending opening of the piston, said end section being located at the side of the connection element, and a second hydraulic connection opens into the hollow cylinder between the second sealing section and the end of the piston sliding surface which confronts such second sealing section.

4 Claims, 1 Drawing Figure

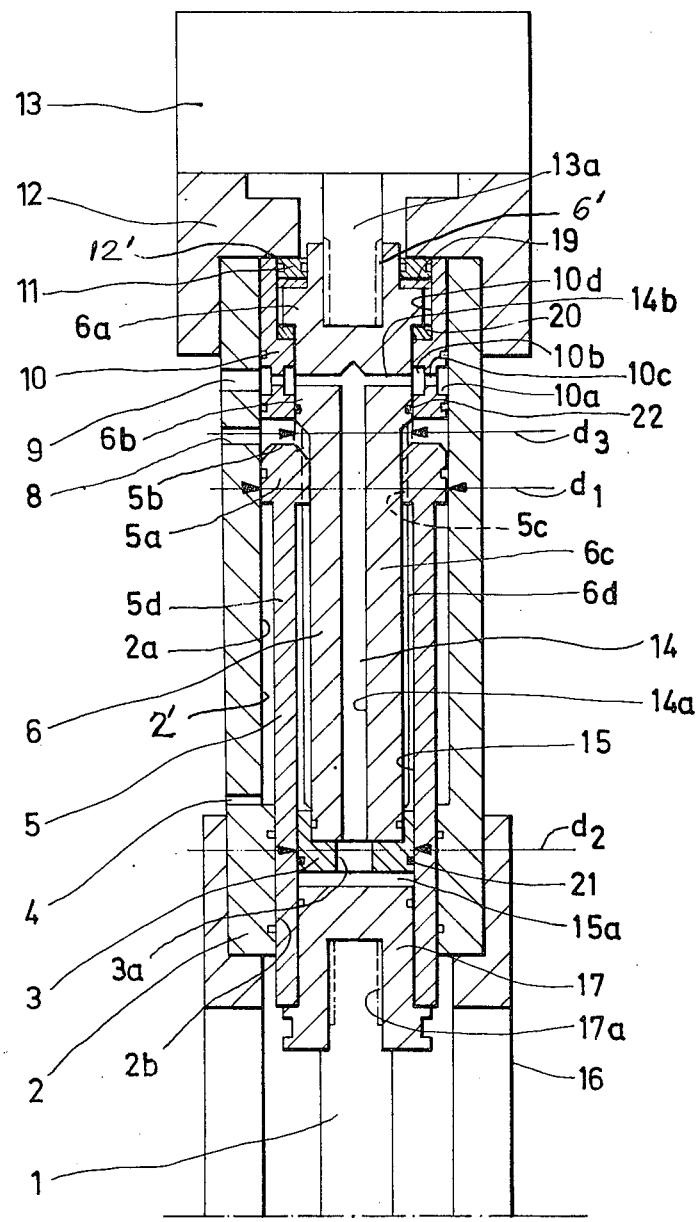

APPARATUS FOR ROTATING AND DISPLACING IN AXIAL DIRECTION A MACHINE ELEMENT

BACKGROUND OF THE INVENTION

The present invention relates to an improved construction of apparatus for selectively moving, for instance and/or displacing in axial direction a machine element.

Injection molding machines oftentimes possess a hollow cylinder equipped with a worm spindle which is rotatable and axially displaceable therein, by means of which the plastic-molding material is plasticized and subsequently expelled through a nozzle into the molding tool. The end of the worm spindle facing away from the nozzle is operatively coupled with a drive apparatus by means of which there can be alternately or simultaneously produced a rotational movement and an axial displacement.

The heretofore known drive apparatuses of this type embody a hydraulic cylinder by means of which there can be displaced in the lengthwise direction of the worm spindle a punch which is in alignment with such worm spindle. The punch is connected with a rotatably and displaceably mounted shaft which may be equipped with a pinion meshing with the pinion of an electric or hydraulic motor.

During the plastification operation the plasticized molding mass tends to collect in front of the nozzle. Consequently, during the time that the worm spindle rotates it is successively displaced away from the nozzle towards the rear, in other words in the direction of the drive apparatus. As a result considerable axial forces are transmitted to the shaft of the drive apparatus. With the state-of-the-art drive apparatuses such axial forces are taken-up by an axial bearing which generally is constructed as a roller bearing. With most of the prior art constructional manifestations this axial bearing must also transmit that force by means of which the worm spindle is pushed towards the front during the time that the molding mass is pressed into the molding tool or mold. This axial bearing must be capable of taking-up very large forces and hence it must possess a large and robust construction. Consequently, such bearing considerably increases the costs of the machine.

SUMMARY OF THE INVENTION

Hence it is a primary object of the present invention to provide an improved construction of apparatus for rotating and displacing in axial direction a machine component or element in a manner not associated with the aforementioned drawbacks and limitations of the prior art constructions.

Another and more specific object of the invention aims at the provision of an apparatus which is suitable for rotating and displacing a worm spindle and in which apparatus there is not required any axial bearing for taking-up the forces exerted upon the worm spindle during the plasticizing of the molding mass.

It is to be however expressly understood that the apparatus of this development is not only suitable for driving a worm spindle rather can also be successfully employed for the drive of other machine elements which must be rotated and displaced in axial direction. Hence the description of the invention in terms of an injection molding machine has been given purely by way of example as one possible advantageous use of the drive apparatus of this development.

The invention is thus specifically concerned with an apparatus for alternately or simultaneously rotating and displacing in axial direction a machine element mounted to be rotatable and displaceable, and incorporates a motor and a hollow cylinder containing a piston displaceable therein. According to the invention the apparatus of this development is manifested by the features that the piston possesses a connection element in order to rigidly connect it with the machine element and a longitudinal opening which is sealingly closed towards the outside at the end thereof which is at the side of the connection element and at the other end of which extends into such opening a drive shaft connected with the motor. The drive shaft at the end thereof located at the side of the connection element possesses a first sealing section which forms a tight sliding seat with the inner surface of the piston and at the region of its end connected with the motor possesses a second sealing section which forms a tight closing sliding seat with the hollow cylinder or with an element rigidly connected therewith. The piston and the drive shaft possess coupling means between both of the aforesaid sealing sections which rigidly rotatably interconnect the piston and the drive shaft but permit mutual displacement of such piston and drive shaft. The drive shaft possesses a throughpassage or bore which connects a first hydraulic connection with the end section of the longitudinal or lengthwise opening of the piston and which end section is at the side of the connection element. There is also provided a second hydraulic connection which opens into the hollow cylinder at a location between the second sealing section and the end of the piston sliding surface confronting such second sealing section.

BRIEF DESCRIPTION OF THE DRAWING

The invention will be better understood and objects other than those set forth above, will become apparent when consideration is given to the following detailed description thereof. Such description makes reference to the annexed drawing wherein there is disclosed an exemplary embodiment of apparatus in longitudinal sectional view for generating a rotational movement and an axially displaceable movement.

DETAILED DESCRIPTION OF THE PREFERRED EMBODIMENTS

Before considering the drawing in detail it is to be understood, as previously mentioned, that the invention will be described purely by way of example in conjunction with an injection molding machine. In order to simplify the illustration of the drawing only enough of the structure of the injection molding machine has been shown so that those skilled in the art will readily appreciate the basic and underlying concepts of the invention. It is further to be noted that the drive apparatus for space-saving reasons has been shown oriented so as to have a vertically extending lengthwise axis. On the other hand, when the drive apparatus is used in the environment of an injection molding machine the worm spindles and accordingly the drive apparatuses are generally arranged in such a manner that their axes extend in horizontal direction.

As mentioned above the drive apparatus as illustrated in the single Figure of the drawing has been shown by way of example as consitituting part of an injection molding machine. Such embodies a worm spindle 1 which is rotatably and displaceably mounted and guided in a not particularly illustrated hollow cylinder. As is known in the injection molding art at one end of the hollow cylinder there is attached a nozzle. The other end of the hollow cylinder is connected through the agency of a connection pipe or conduit 16 with the hollow cylinder 2 of the drive apparatus. This hollow cylinder 2 in turn is fixedly connected with a not particularly illustrated part of the machine frame or housing. The other end of the hollow cylinder 2 is fixedly connected with a flange 12 at which there is secured a suitable motor, such as an electric or hydraulic motor 13. The hollow cylinder 2 is provided with a continuous bore 2′ which at the side confronting the motor 13 possesses a longer section 2a and at the other end a shorter somewhat narrower section 2b.

At the end of the hollow cylinder 2 confronting the motor 13 there is inserted a sleeve 10 in the section 2a of the lengthwise or longitudinal bore 2′ and fixedly connected with the hollow cylinder 2 by means of any suitable fastening or attachment means which have not been particularly shown. The sleeve 10 possesses at its outer surface two non-referenced annular or ring-shaped grooves in which there are arranged O-rings for sealing purposes. Moreover, the sleeve 10 at the region between both of the sealing 0-rings possesses at the outside and the inside a respective annular or ring-shaped groove 10a and 10b. Both of the ring-shaped grooves 10a, 10b are connected with one another by a number of radial bores 10c. The jacket of the hollow cylinder 2 is equipped with a bore 9 opening into the ring-shaped groove 10a, this bore 9 constituting a first hydraulic connection which can be operatively connected with a hydraulic line or conduit.

The central opening of the sleeve 10 possesses a widened portion 10d at the side confronting the motor 13. In such widened or enlarged portion 10d there is inserted a ring 11 at the end of the sleeve 10, ring 11 being provided at the outside and the inside with a respective annular groove in which there is inserted a respective sealing 0-ring. The end surface or face of the ring 11 confronting the motor 13 bears against a flange section 12′ of the flange 12. Continuing, in the hollow cylinder 2 there is arranged a displaceable as well as also rotatable piston 5. This piston 5 is provided with a continuous lengthwise opening 15 which at the end confronting the worm spindle 1 is sealingly closed towards the outside by means of a plug 17. This plug 17 is provided with a coaxial bore 17a at its side facing away from the motor 13 and in which bore there is seated the end of the worm spindle 1. The latter and the plug 17 may be interconnected rigidly for rotation and so as to be non-displaceable by means of a spring-groove-connection, by wedges or keys or any other suitable means. The plug 17 thus forms a connection element or member by means of which the piston 5 can be rigidly connected with the worm spindle 1.

At its end confronting the motor 13 the hollow piston 5 possesses a short substantially ring-shaped section 5a, the outer diameter of which has been designated by reference character $d_1$ and its outer surface serves as a sliding surface and forms together with the cylinder-inner surface bounding the bore section 2a a sliding seat. The section 5a is provided at the outside with an annular groove in which there is inserted a not particularly illustrated but conventional sealing ring serving for sealing the sliding seat. The section 5a possesses a ring-shaped edge or face 5b which protrudes towards the motor 13, and the cross-sectional surface of which is somewhat smaller than that of the section 5a. The section 5a is furthermore provided at the inner side with grooves 5c extending in the lengthwise direction and uniformly distributed over the periphery thereof.

The longer section 5d of the piston 5 merging at the ring-shaped section 5a possesses an external diameter which is somewhat smaller than that of the section 5a and is so dimensioned that the piston section 5d together with the bore section 2b of the hollow cylinder 2 forms a sliding seat. Inserted into the hollow cylinder are additional sealing rings which seal such sliding seat. The internal diameter of the piston section 5d is somewhat greater than the internal diameter of the section 5a. Into the end of the lengthwise opening 15 of the piston 5, and which end confronts the motor 13, there extends a drive shaft 6. Such is provided at its end confronting the motor 13 with a coaxial blindhole bore 6′ into which extends the free end of the shaft 13a of the motor 13. Both of the shafts 13a and 6 are rigidly rotatably interconnected by, for instance, a spring-groove-connection, wedges or keys or in any other suitable way. The shaft 6 possesses a ring-shaped collar 6a at its end near to the region of the motor. This collar extends into the groove formed by the widened or enlarged portion 10d of the sleeve 10 and the ring 11. Furthermore, in this groove there is arranged at both faces of the collar 6a a bearing ring 19 and 20 respectively. The widened portion 10d together with the ring 11 forms an axial bearing which is tightly sealed towards the outside. As will be explained more fully hereinafter, the drive shaft during a certain operational phase, when it does not rotate, is presses towards the motor 13. The collar 10d then serves as a stop which transmits the forces exerted upon the drive shaft to the flange 12.

The drive shaft 6 is provided at its end confronting the connection element 17 with a sleeve-shaped head piece or element 3 having a continuous lengthwise or longitudinal opening 3a. The outer surface of the head piece 3 and the inner surface of the piston 5 collectively form a sliding seat which is sealed by a sealing ring 21 inserted into a groove of the head piece 3. The head piece 3 possesses an external diameter $d_2$ and in the description to follow will also be conveniently referred to as the first sealing section of the drive shaft 6.

At the region of the end of the drive shaft which is at the side of the motor such drive shaft possesses a cylindrical section 6b which together with the sleeve 10 secured in the hollow cylinder 2 forms a sliding seat. Such is likewise sealed by a sealing ring 22. The section 6b in the description to follow will be conveniently referred to as the second sealing section of the drive shaft. The outer diameter of the second sealing section 6b has been designated by reference character $d_3$ and is equal to the outer diameter $d_2$ of the first sealing section 3.

The section 6c of the drive shaft 6 which is located between the first sealing section 3 and the second sealing section 6b is somewhat thinner than both sealing sections 3, 6b and equipped with lengthwise extending ribs 6d which essentially extend over its entire length and extend into the grooves 5c of the piston section 5b. As will be recognized from the single Figure of the drawing the height of the lengthwise extending ribs 6d are dimensioned such that between such ribs and the inner surface of the piston section 5d there is present a free intermediate space. The grooves 5c and the ribs 6d collectively form coupling means which rigidly connect for rotation with one another yet mutually displaceable relative to one another the piston 5 and the drive shaft 6.

The drive shaft 6 is provided with a coaxial blindhole bore 14a, the mouth of which is located at the end of the drive shaft confronting the connection element 17. Radial bores 14b open into the blindhole bore 14a, and the outer mouths of such bores 14b are located at the region of the ring-shaped or annular groove 10b of the sleeve 10. The bores 14a and 14b collectively form a throughpassage or passageway 14 which connects the opening 9 forming the first hydraulic connection with the end section 15a of the piston-lengthwise opening 15, and which end section 15a is at the side of the connection element. The hollow cylinder 2 is provided at the edge of the sleeve 10 which faces the connection element 17 with a bore 8 opening into its internal compartment. The bore 8 can be connected with a hydraulic line or conduit and forms a second hydraulic connection which thus opens between the second sealing section 6b of the drive shaft 6 and the end of the sliding surface of the piston 5 confronting such drive shaft into the internal compartment of the hollow cylinder 2.

Additionally, the hollow cylinder 2 is provided with a radial bore 4 which opens into the end of the wider bore section 2a and which end confronts the connection element 17. This bore 4 forms a third hydraulic connection which at the region of the thinner piston section 5d opens into the internal compartment or space 2a, 2b of the hollow cylinder 2.

Having now had the benefit of the foregoing description of the drive apparatus of this invention according to one preferred exemplary constructional manifestation thereof, there will now hereinafter be described the function of such apparatus.

At the start of a work cycle the worm spindle 1 is located quite close to the nozzle. The piston 5 accordingly is located in one of its terminal positions, and specifically in that position where a considerable part of its section 5d protrudes out of the hollow cylinder 2. The now beginning first working operation will be referred to hereinafter as the dosing phase or step. During this dosing phase the motor 13 places the drive shaft 6 in rotation. This rotational movement is transmitted via the coupling means 5c, 6d to the piston 5 which in turn is rigidly connected for rotation through the agency of the connection element or member 17 with the worm spindle 1. The latter thus carries out a rotational movement during the dosing phase. Now the worm spindle has delivered thereto the plastic molding mass which is to be processed at the end thereof facing away from the nozzle. This molding mass is transported by the worm spindle towards the nozzle and thus plasticized. The nozzle is closed during this phase, so that the plasticized molding mass collects at the nozzle side-end of the worm spindle 1. The worm spindle 1 is displaced towards the rear by the collecting molding mass. This displacement of course is transmitted to the piston 5, so that such moves towards the motor 13. The plasticizing process is continued until there has collected in front of the nozzle the quantity of plasticized molding mass needed to fabricate a molded part. During this working step the molding mass is thus plasticized and dosed. This operation can be continued at most for such length of time until the piston edge 5b bears against the sleeve 10.

During the dosing phase or step the first hydraulic connection and the third hydraulic connection, that is to say the openings 9 and 4, are directly flow connected with the supply container or reservoir containing the hydraulic agent or fluid and thus are not impinged with pressure. When the piston 5 has been pushed into the hollow cylinder, then hydraulic fluid is expelled through the second hydraulic connection 8 out of the hollow cylinder 2. The second hydraulic connection 8 is however, during the dosing phase, connected with an element which maintains the outflowing hydraulic fluid or agent at a constant excess pressure which counteracts the displacement movement. In this way the displacement movement of the worm spindle can be controlled such that the plasticized molding mass is subjected to an advantageous pressure. Since the grooves 5c an the ribs 6d do not form any tight closure generally also hydraulic fluid is located in the intermediate space between the head piece 3 forming the first sealing section of the drive shaft 6 and the piston section 5a. This hydraulic fluid arrangement of course likewise is under pressure. Since however the first and the second sealing sections 3, 6b of the drive shaft 6 have the same diameter the axial forces exerted by the hydraulic fluid on the drive shaft are compensated. Hence the drive shaft, during the time that it rotates, is only exposed to an axial force by virtue of the friction occuring during the displacement of the piston. Since the hydraulic fluid simultaneously functions as a lubricant the friction between the grooves 5c and the ribs 6d is relatively small notwithstanding the rotational moment which is to be transmitted during rotation. The axial force which occurs during the dosing phase and acts upon the drive shaft is then transmitted via the ring 11 to the flange 12 and from such to the hollow cylinder 2 and the machine frame. Since this axial force is relatively small there are not required for the transmission thereof any roller bearing.

The axial force could be compensated in that the diameter $d_2$ of the first sealing section 3 is made somewhat larger than the diameter $d_3$ of the second sealing section 6b. The hydraulic fluid would then impinge the drive shaft 6 with an axial force directed towards the worm spindle 1. When the diameters $d_2$, $d_3$ and the pressure are suitably matched to one another then the drive shaft can be maintained completely free of force.

At the end of the dosing phase the motor 13 is turned-off for instance by means of a terminal switch cooperating with the piston 5, so that the worm spindle now no longer rotates. The working step which now begins will be conveniently designated hereinafter as the injection phase. During such the worm spindle is displaced towards the nozzle and the previously plasticized molding mass or compound is pressed into the molding tool or mold. Furthermore, by means of the first and the second hydraulic connections 9 and 8 there is forced in under pressure hydraulic fluid. The third hydraulic connection 4, during this operational phase, is directly connected with the supply container or reservoir and thus without pressure.

The hydraulic fluid or agent delivered by the first hydraulic connection 9 impinges the connection element 17 which is rigidly and sealingly coupled with the piston by means of an axial force. The magnitude of this axial force is proportional to the area or surface $d_2^2 \pi 4$. The hydraulic fluid delivered by the second hydraulic connection 8 impinges with pressure against the section 5a of the piston 5. Consequently, there results an axial force which is directed away from the motor 13, the magnitude of which is proportional to the area $(d_1^2 - d_2^2)\pi/4$. When both hydraulic connections are impinged with the same pressure, then, the piston is pressed away from the motor 13 with a total force, the magnitude of which is determined by the product:

Pressure of the hydraulic agent $\times \pi/4\ d_1^2$.

The drive shaft 6, which as mentioned, does not rotate during the injection phase, is then exposed or impinged by a reaction force. The magnitude thereof equals the product:

Pressure of the hydraulic agent $\times \pi/4\ d_2^2$. This reaction force is then transmitted by the collar 6a, serving as a stop during this phase, to the flange 12 and via such to the machine frame.

During conventional operation both of the previously described working steps are alternately carried out. It is however also possible to simultaneously rotate and displace the worm spindle towards the nozzle. This working step or phase can be designated for instance as injection with rotating worm spindle. With this phase the motor 13 is in operation and the drive shaft 6 is rotated. By means of the second hydraulic connection 8 there is delivered hydraulic agent under pressure which impinges the section 5a of the piston with a force. Both of the other hydraulic connections 4 and 9 during this phase are connected with the supply container or reservoir and without pressure. The friction between the piston 5 moving away from the motor 13 and the drive shaft 6 brings about that the latter is impinged by an axial force which is directed away from the motor 13. This force is then transmitted via the collar 6a to the sleeve 10 and thus to the hollow cylinder 2.

According to a further mode of operation, which can for instance be designated as extruder operation, the piston is located in an intermediate position and is rotated by the drive shaft. When the second hydraulic connection 8 is closed and both of the other connections are without pressure then the rotating piston is fixedly held against displacement in this position.

At the end of the dosing operation it is sometimes necessary to retract the worm spindle 1 with an external force in order to obtain a reduction in pressure at the sprue plug. This return or retraction movement of the worm spindle can be produced in that hydraulic agent which is under pressure is delivered through the third hydraulic connection 4. Naturally then, both of the other connections must not be under pressure.

The exemplary embodiment of apparatus heretofore described can be of course modified in different ways. For instance it is possible for the lengthwise opening of the piston to be constructed as a blindhole bore. The plug 17 also could be then omitted and the worm spindle directly connected with the piston by means of a suitable connection means.

Furthermore, it would be possible to omit the sleeve 10 and in place thereof to provide the hollow cylinder 2 with an appropriate tapered portion.

Moreover, as already mentioned heretofore, the apparatus of this development is not only suitable for the drive of a worm spindle rather can serve to drive another machine element which must be alternately or simultaneously rotated and displaced.

While there is shown and described present preferred embodiments of the invention, it is to be distinctly understood that the invention is not limited thereto but may be otherwise variously embodied and practiced within the the scope of the following claims. Accordingly,

What is claimed is:

1. An apparatus for selectively moving a machine element mounted to be rotatable and axially displaceable, comprising a motor, a hollow cylinder, a piston displaceably arranged in said hollow cylinder, a machine element, said piston being provided with a connection element for rigidly connecting said piston with said machine element, said piston having a lengthwise extending opening including opposed ends, means for sealing one end of the lengthwise extending opening confronting the connection element, a drive shaft extending into said lengthwise extending opening from the other end thereof opposite said one end, means for connecting said drive shaft with said motor first sealing means for sealing said drive shaft at the region of the connection element with respect to an inner surface of the piston forming a first sealing section said piston being slidable with respect to said drive shaft, second sealing means for sealing said drive shaft at the region of its end connected with said motor with respect to said cylinder and forming a second sealing section, said second sealing means including means which together with the second sealing section form a tightly closing seat, said piston and said drive shaft possessing coupling means disposed between both of said sealing sections, said coupling means rigidly rotatably connecting the piston and the drive shaft with one another but permitting axial displacement relative to one another, means defining a first hydraulic connection for the infeed of a hydraulic agent for displacing said piston in one direction, said drive shaft possessing a throughpassage means which connects said first hydraulic connection with an end section of the lengthwise extending opening of the piston, said end section being located at the side of the connection element, a second hydraulic connection for the infeed of a hydraulic agent which opens into the hollow cylinder between the second sealing section and an end of a sliding surface of the piston which confronts said second sealing section for displacing the piston in said one direction, said first sealing section and said second sealing section possessing the same diameter, said first sealing section and said second sealing section constituting the sole sealing sections for preventing the hydraulic agent from impinging the drive shaft with axial forces during a working phase of the apparatus.

2. The apparatus as defined in claim 1, wherein said drive shaft is equipped with a stop in order to transmit the axial forces to the hollow cylinder which arise during certain operational phases when the drive shaft is not rotating.

3. The apparatus as defined in claim 1, wherein the end of the piston at the side of the connection element possesses a section having a smaller external diameter and at its other end a section of larger external diameter, and wherein there is provided a third hydraulic connection which opens at the region of the piston section possessing the smaller diameter into the hollow cylinder for displacing the piston in a direction opposite to said one direction.

4. The apparatus as defined in claim 1, wherein said means which together with the second sealing section from said tightly closing seat comprises an element including means for rigidly connecting said element with respect to said hollow cylinder.

* * * * *